(12) United States Patent
Pirinoli

(10) Patent No.: US 7,161,687 B2
(45) Date of Patent: Jan. 9, 2007

(54) OPTICAL METHOD AND DEVICE FOR PERFORMING GEOMETRICAL MEASUREMENTS

(75) Inventor: Enrico Maria Pirinoli, Turin (IT)

(73) Assignee: Area Sistemi S.r.l., Turin (IT)

( * ) Notice: Subject to any disclaimer, the term of this patent is extended or adjusted under 35 U.S.C. 154(b) by 217 days.

(21) Appl. No.: 10/501,327

(22) PCT Filed: Jan. 29, 2003

(86) PCT No.: PCT/EP03/00897

§ 371 (c)(1),
(2), (4) Date: Jul. 22, 2004

(87) PCT Pub. No.: WO03/067184

PCT Pub. Date: Aug. 14, 2003

(65) Prior Publication Data

US 2005/0078322 A1    Apr. 14, 2005

(30) Foreign Application Priority Data

Feb. 4, 2002    (EP)    ................... 02425052

(51) Int. Cl.
*G01B 11/14*    (2006.01)
(52) U.S. Cl. ...................... 356/625; 356/638

(58) Field of Classification Search ............... 356/625, 356/638, 635, 636, 640, 73.1; 250/559.12, 250/559.19, 559.27, 559.24
See application file for complete search history.

(56) References Cited

U.S. PATENT DOCUMENTS

| 4,417,147 | A | * | 11/1983 | Faville | ................... 250/559.14 |
| 6,922,254 | B1 | * | 7/2005 | Blohm et al. | ............... 356/638 |
| 2003/0160974 | A1 | * | 8/2003 | Demeyere et al. | .......... 356/635 |

* cited by examiner

*Primary Examiner*—Hoa Q. Pham
*Assistant Examiner*—Tri Ton
(74) *Attorney, Agent, or Firm*—Bacon & Thomas, PLLC

(57) ABSTRACT

A light source (1) sends towards an object under test (5) a light beam (2) with such a size as to encompass the object (5). Past the object, the beam (2) is processed by an optical processing system (6), comprising a band-pass spatial filter (8) located in the Fourier Plane of a converging lens (7), the object (5) being located in the front focal plane of that lens. The filtered beam is collected by a detector (10) that generates an electrical signal representative of the intensity of the field distribution associated with that beam. A system (11) for processing the electrical signal comprises a band-pass filter (12) with temporal cut-off frequencies corresponding with the spatial cut-off frequencies of the spatial filter in the optical processing system (6) and obtains the value of the requested quantity form the electrical signal.

23 Claims, 7 Drawing Sheets

OPTICAL METHOD AND DEVICE FOR PERFORMING GEOMETRICAL MEASUREMENTS

BACKGROUND OF THE INVENTION

1. Field of the Invention

The present invention relates to optical systems for performing geometrical measurements, and more particularly it concerns a method of and a device for performing geometrical measurements on objects, even while same are moving.

2. Description of Related Art

An important problem arising in production of objects such as metal wires, textile fibres, optical fibres, or extruded or turned materials, is the continuous and on-line measurement of their geometrical sizes, such as their diameter or thickness (or generally the distance between two edges), or of the position of an edge relative to a reference.

A general requirement is to measure even very small sizes (e.g. of the order of the hundredths of millimetre) with high precision and without interfering with the manufacturing process.

The measurement techniques best suited for the attainment of those objectives are based upon an optical processing of a beam illuminating the object to be measured. An image containing the requested dimensional information is formed on a detector and the information is then extracted through a suitable electronic processing. Those techniques allow performing an on-line measurement without direct contact with the object to be measured, thus without stopping or slowing down the manufacturing process.

Among those techniques, those based upon the analysis of the light diffracted by the object when the latter is illuminated by a well-collimated laser beam are particularly interesting. Examples are disclosed in the paper "Absolute diameter measurement", by J. Kiss, Wire & Cable Technology International, March 1999, pages 193 to 194, and in WO-A 8904946. In such examples, the diffracted light is collected by a charge-coupled device (CCD) detector, of which the size is equal to the entire measurement range. Such apparatuses do not include moving mechanical parts, contrary to commercially available instruments based upon the scanning of a laser beam by means of rotary mirrors. Therefore such apparatuses are more reliable, even if signal processing is still rather complex.

Another technique is disclosed for instance by F. Docchio et al. in the paper "On-Line Dimensional Analysis of Surfaces Using Optical Filtering and Elaboration Techniques in the Fourier Plane", IEEE Transactions on Instrumentation and Measurement, Vol. 38, No. 3, June 1989, pages 811 to 814. According to such technique, the diffracted beam is submitted to a spatial filtering carried out according to the Fourier optics techniques. For instance, for measuring the diameter of a wire, the filtering is carried out by means of a high-pass filter comprising a circular opaque member of suitable diameter placed on the optical axis of the system. The filtering enhances the image contour and provides on the detector an intensity distribution comprising a very narrow peak in correspondence with the object edges. The measurement of the object is thus made easier.

Otherwise stated, the spatial filtering allows getting a very "clean" electrical signal, from which the requested measure can be obtained. Yet such a result, even if analytically valid, can be obtained in practice only by using an optical system very close to an ideal system, that is a system in which:

the laser source is perfectly collimated and monochromatic;
the object under measurement is exactly placed in the focal plane of a lens of the optical processing system;
the lenses are thin lenses, without aberrations;
the lens apertures are very great if compared to the size to be measured.

The practical experience shows how difficult actually is to meet such conditions during an industrial manufacturing process. Such conditions can be reproduced at most in a laboratory, by using complex and therefore expensive instrumentation and by performing the measurements on carefully positioned objects, preferably on stationary objects.

If one attempts to build an apparatus that does not meet even only one of the ideal requirements, there is experimentally observed that a narrow intensity peak is no longer created, but a loss of definition of the peak is observed (this is the usual experience of an out-of-focus image, where the figure contours are no longer sharp), together with an increase of the background noise due to high spatial frequency components which become quantitatively important. The determination of the exact points corresponding to the object edges would therefore be affected by a non negligible uncertainty, which is not acceptable if a sub-micron precision is required.

SUMMARY OF THE INVENTION

It is an object of the present invention to develop a measurement technique, which is suited to apparatuses of limited cost, in order to perform measurements on objects that could even be rapidly moving and that could undergo limited displacements from the focal plane. In other words, the invention is intended for industrial applications, where the apparatus are to be used in conditions that can be heavy and very far from the ideal conditions existing in a laboratory, and for performing continuous measurements on moving objects.

The object of the invention is attained thanks to a band-pass spatial filtering, which is performed by a filter with a particular construction, is used to minimise or cancel noise sources due to the non-ideal apparatus components, and is associated with a peculiar processing of an electrical signal resulting from the detection of a filtered light signal. Such processing allows identifying the exact spatial position of the edges of the illuminated object through the signal analysis only.

BRIEF DESCRIPTION OF THE DRAWINGS

For a better understanding, reference is made to the accompanying drawings, which show an exemplary embodiment of the invention and in which:

FIG. 7b is a chart of the square of the sum of the two integral-sinus functions shown in FIG. 7a;

Figure 1:
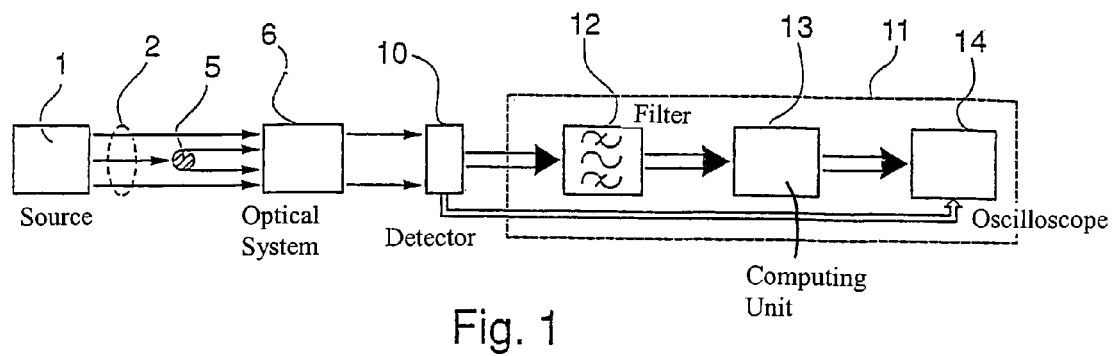
FIG. 1 is a block diagram of the device according to the invention.

In the drawings, single line arrows show the path of optical signals and double-line arrows the path of electrical signals. Moreover, for sake of clarity, the size of the object to be measured is greatly enlarged and it is not in scale with the size of the other device components.

DETAILED DESCRIPTION OF THE PREFERRED EMBODIMENTS

As shown in FIG. 1, the device according to the invention essentially comprises:

a light source 1, more particularly a laser diode, emitting a monochromatic light beam 2 with a field distribution with substantially constant intensity level and such a width as to encompass the object under test 5;

an optical processing system 6, comprising a band-pass spatial filter, said system receiving and processing the beam past object 5;

a detector 10, more particularly of the type enclosing a CCD array, arranged to build an image of the beam outgoing from optical processing system 6 and to generate an electrical signal representative of the intensity of the field distribution associated with such a beam; and means 11 for processing the electrical signal generated by detector 10, said means comprising: a band-pass filter 12 with cut-off (temporal) frequencies corresponding to the cut-off spatial frequencies of the band-pass filter in optical processing system 6; a computing unit 13 (a microprocessor or the like) for determining the value of the requested quantity; and possibly an oscilloscope 14. Electrical band-pass filter 12 can be either a hardware unit or a software unit, i.e. it can be part of the program of computing unit 13. In the case of on-line measurements during a manufacturing process, unit 13 can be part of a more general process control system.

Hereinafter it will be assumed that the object under measurement is a wire 5 the diameter of which is to be measured. Moreover, it will be assumed that the wire is oriented according to the Y-axis of an orthogonal Cartesian system with origin on the optical axis of the measurement system, and that light beam 2 propagates in a direction parallel to the Z-axis. The measurement, that in the described embodiment is a unidimensional measurement, will take place along the X-axis.

Figure 2:
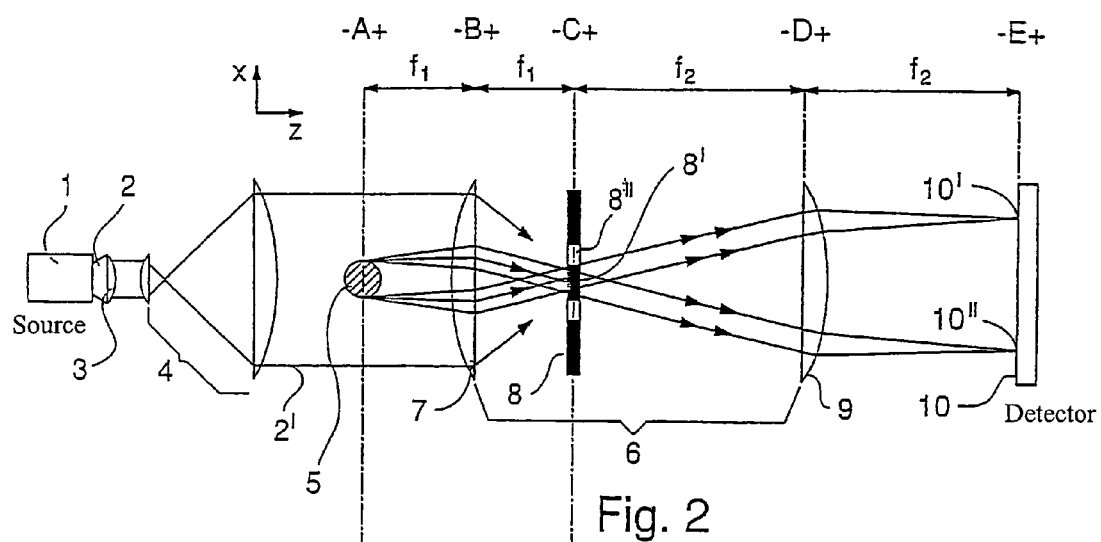
FIGS. 2 and 3 are schematic side and plan view representations, respectively, of the optical system of the device of FIG. 1.
Figure 3:
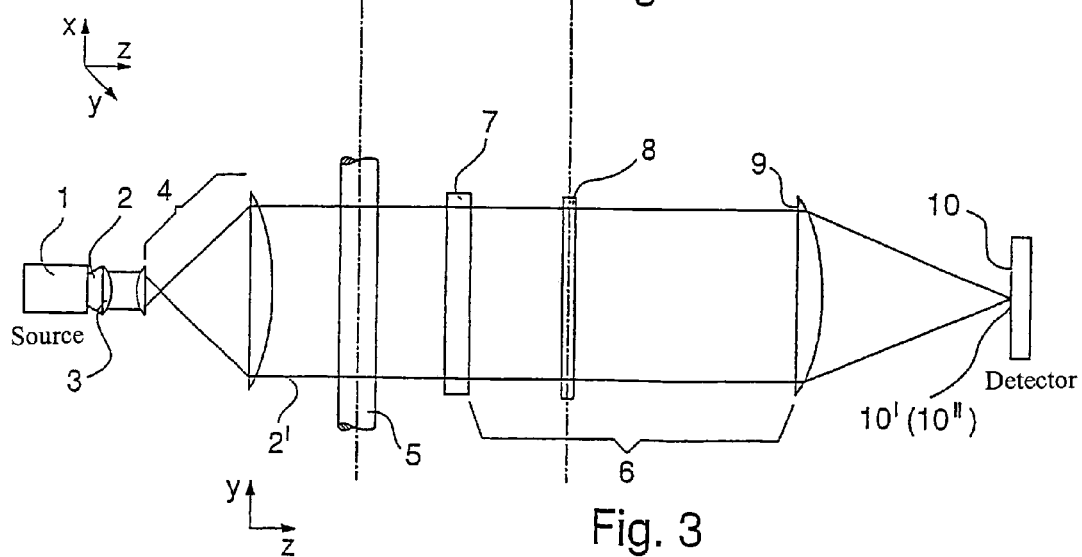

Referring to FIGS. 2 and 3, beam 2 emitted by source 1 is collimated by a collimating optics, consisting e.g. of a converging lens 3, and expanded by a beam expander 4 up to a size, along the X-axis, exceeding the diameter of wire 5. The wire is preferably located in the central portion of collimated and expanded beam 2'. Optical system 6 processing the beam partly intercepted and diffracted by wire 5, comprises a first converging lens 7 of focal length $f_1$, the band-pass spatial filter 8, described in more details hereinafter, and a second converging lens 9, of focal length $f_2$, confocal to lens 7. Wire 5 is placed in the front focal plane A of lens 7, whereas spatial filter 8 is placed in the common focal plane C of lenses 7, 9. Detector 10 is in turn placed in the rear focal plane E of lens 9.

In a case like that being described, in which an exclusively unidimensional measurement is desired, lens 7 can be a cylindrical lens, with its generatrices parallel to wire 5, that is to the Y-axis, whereas lens 9 can be a conventional spherical lens. Since wire 5 is located in front focal plane A of lens 7, the field distribution in rear focal plane C of the same lens is proportional to the unidimensional spatial Fourier transform (computed with respect to measurement direction x) of the field distribution immediately past the object (location A+). The continuous wave component of the spatial field in A+ gives rise, in the Fourier plane, to a very marked peak centred on the optical axis. For the purposes of the dimensional measurement of the object, that peak is of no interest, since the information related with the measure to be detected is encoded in the side fringes of the field distribution in the Fourier plane. Thus, one of the tasks of filter 8, located in rear focal plane C of lens 7, is to remove the unwanted peak thanks to the action of the high-pass filter (corresponding with the opaque beam-stop placed on the optical axis), like in the prior art. The filtered final image, built by lens 9, will show the object edges in positions 10' and 10" with a high contrast relative to the dark background.

Besides eliminating the continuous wave spatial component, filter 8 will also minimise or annul the noise sources due to the non-ideal characteristics of the employed components and to the non-ideal measurement conditions. This occurs thanks to the concurrent action of the low-pass filter.

Figure 4A:
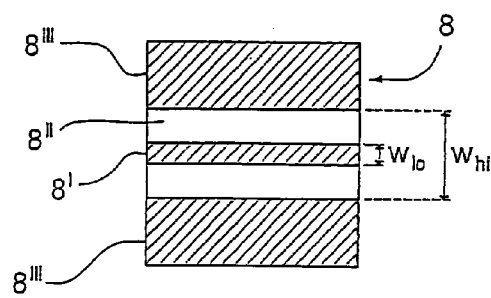
FIG. 4a is a front view of a kind of pass-band filter for a unidimensional measurement.

FIG. 4a shows a possible embodiment of a band-pass filter 8 if an exclusively unidimensional measurement is to be effected. Filter 8 is a mask with an opaque strip 8' having a suitable width $w_{lo}$ in direction x and a longitudinal axis passing through the optical axis. Strip 8' is located in the middle of an elongated transparent window or slot 8", of width $w_{hi}$, also centred on the optical axis of the apparatus. For instance, filter 8 may be a plate which has been made opaque in correspondence of region 8' and of regions 8''' adjacent to the upper and lower edges, and which has two transparent regions symmetrical with respect to opaque strip 8'. If transparent region 8" is a slot, opaque region 8' may be a wire or a rod secured at its ends to the side edges of the plate.

Figure 4B:
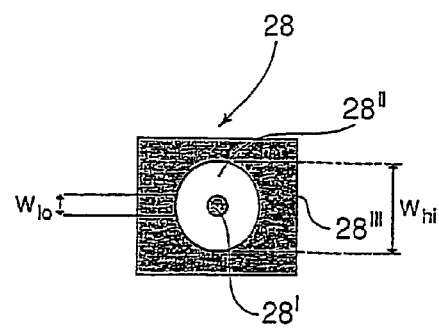
FIG. 4b is a front view of a kind of pass-band filter for a bidimensional measurement.

FIG. 4b shows by way of example a possible embodiment of a band-pass filter 28 if a bidimensional measurement is to be effected. Filter 28 is an opaque mask where a transparent annulus 28" of diameter $w_{hi}$ has been obtained, which annulus defines an inner opaque circle 28' of diameter $w_{lo}$ and an opaque outer region 28'''.

By way of a quantitative indication, if wire 5 has a diameter $w_{strip}=0.1$ mm, $w_{lo}$ could be 0.4 mm and $w_{hi}$ could be 2 mm. For a measurement under such conditions the width of collimated beam 2 could be 4 mm.

In the unidimensional case, the length of regions 8', 8" (that is, their size in direction y) does not affect the filter operation: such length essentially corresponds with the length of the portion of wire 5 focussed by lens 7.

If the device is used to perform measurements on an object displacing along the Y-axis, it is to be taken into account that the optical-to-electrical signal conversion by detector 10 and the processing by processing means 11 demand a non-zero time. Thus, a continuous measurement is obtained it the wire portion focussed by lens 7 is at least equal to the displacement carried out by object 5 during the conversion and processing time.

A mathematical modelling analysis of the optical system behaviour reveals that field distribution detector 10 is a continuous function, more particularly a sum of four integral-sinus functions. Two of the four integral-sinus functions become zero at point $$x = -\frac{f_2}{f_1} \frac{w_{strip}}{2}$$

(and hence they are associated with a first edge of object 5), and the other two are identical to the first two functions but have opposite sign and become zero at point $$x = +\frac{f_2}{f_1} \frac{w_{strip}}{2}$$

(and hence they are associated with the second edge). The two functions of each pair have relative maxima and minima oscillating at different frequencies, which are inversely proportional to constructional dimensions $w_{lo}$ and $w_{hi}$ of filter 8.

Figure 7A:
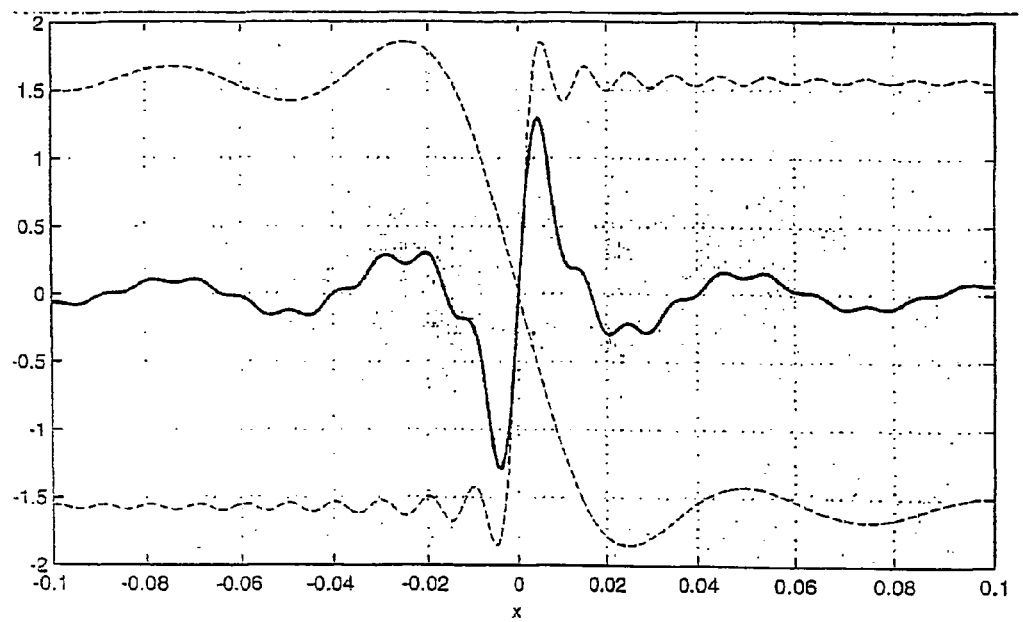
FIG. 7a is a chart of the two integral-sirius functions relating to a same edge (phantom line) and of their sum (thick solid line)
Figure 7B:
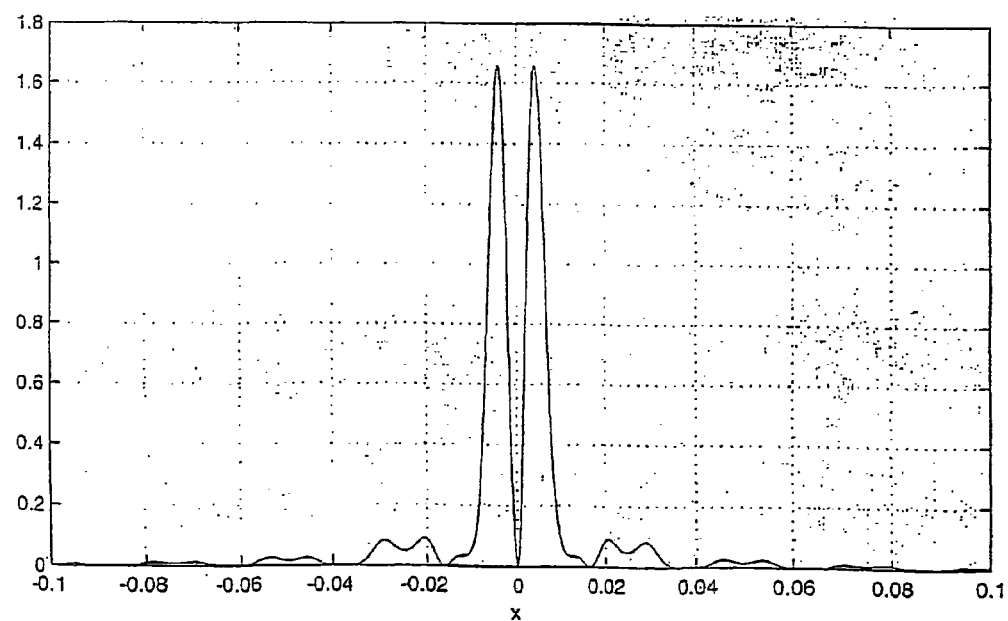

FIG. 7a shows the charts of the two integral-sinus functions associated with a same edge (dashed lines) and of their sum (thick solid line). FIG. 7b shows instead the chart of the square of that sum, which represents the field intensity: actually, only that physical quantity can be detected by the CCD as well as by the human eye.

Figure 5A:
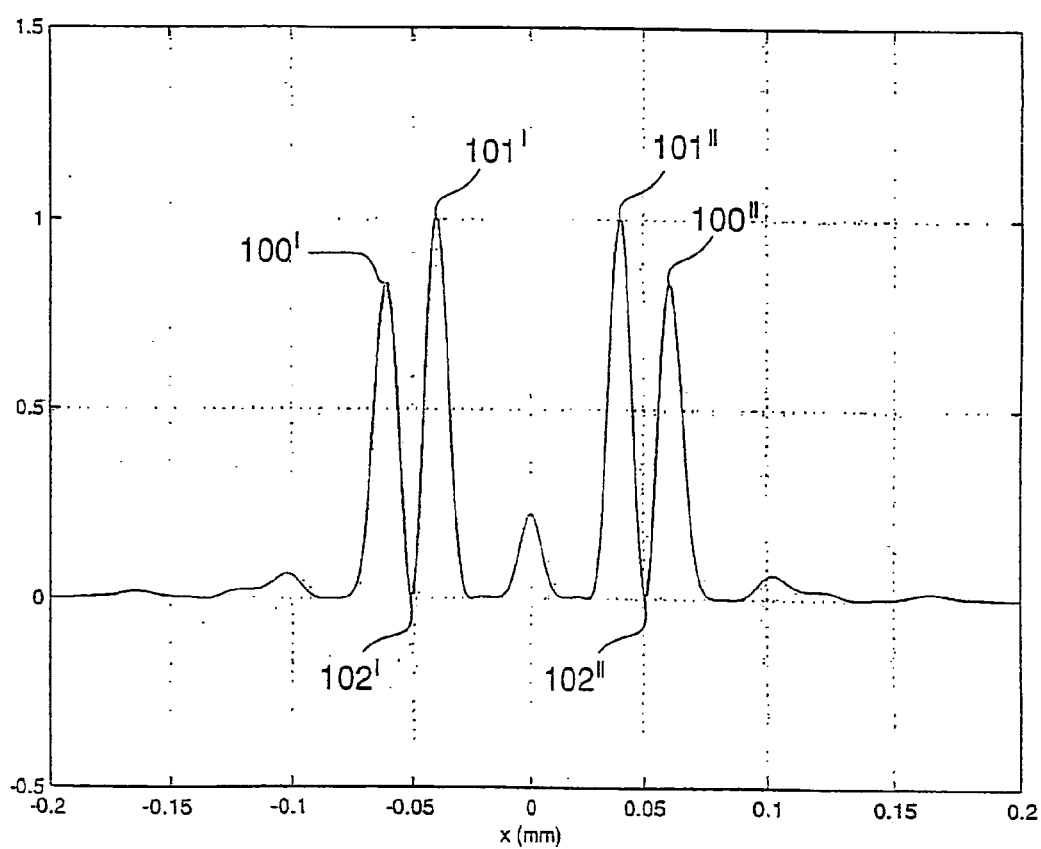
FIGS. 5a and 5b are charts showing the behaviour of the field intensity at the detector for a unidimensional measurement, according to the calculated theoretical prevision and as actually detected, respectively.
Figure 5B:
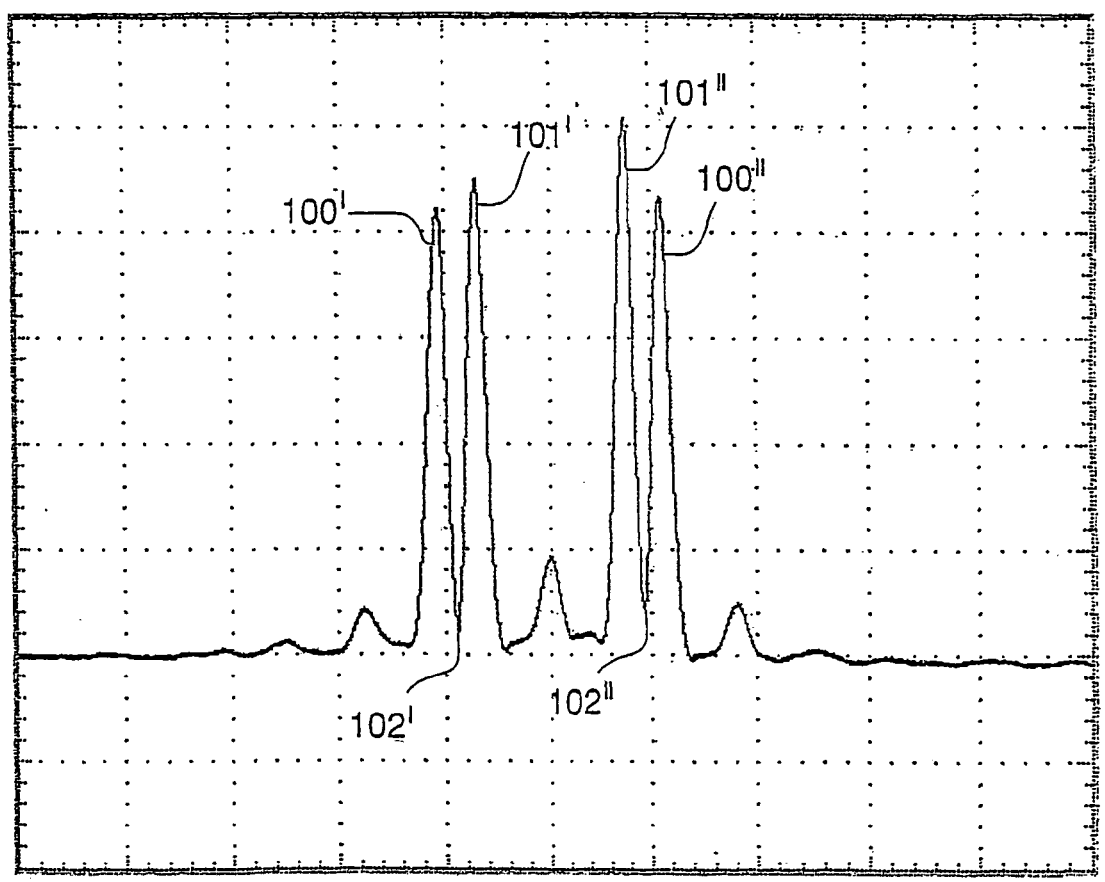

Thus, the field intensity, at each edge of object 5, exhibits a pair of marked maxima separated by a minimum (since the function is a continuous one), instead of the single, very narrow peak obtained by the exclusively high-pass filtering of the prior art. The intensity behaviour resulting from the spatial band-pass filtering is shown in FIGS. 5a, 5b, which are related with the theoretical and the actual behaviour, respectively. The latter has been measured at the oscilloscope for an object 5 and a filter 8 with the characteristics given above. The two pairs of maxima 100', 101' and 100", 101" and the intermediate minima 102', 102" are clearly shown. The requested value will be proportional to the distance between minima 102', 102".

Figure 8:
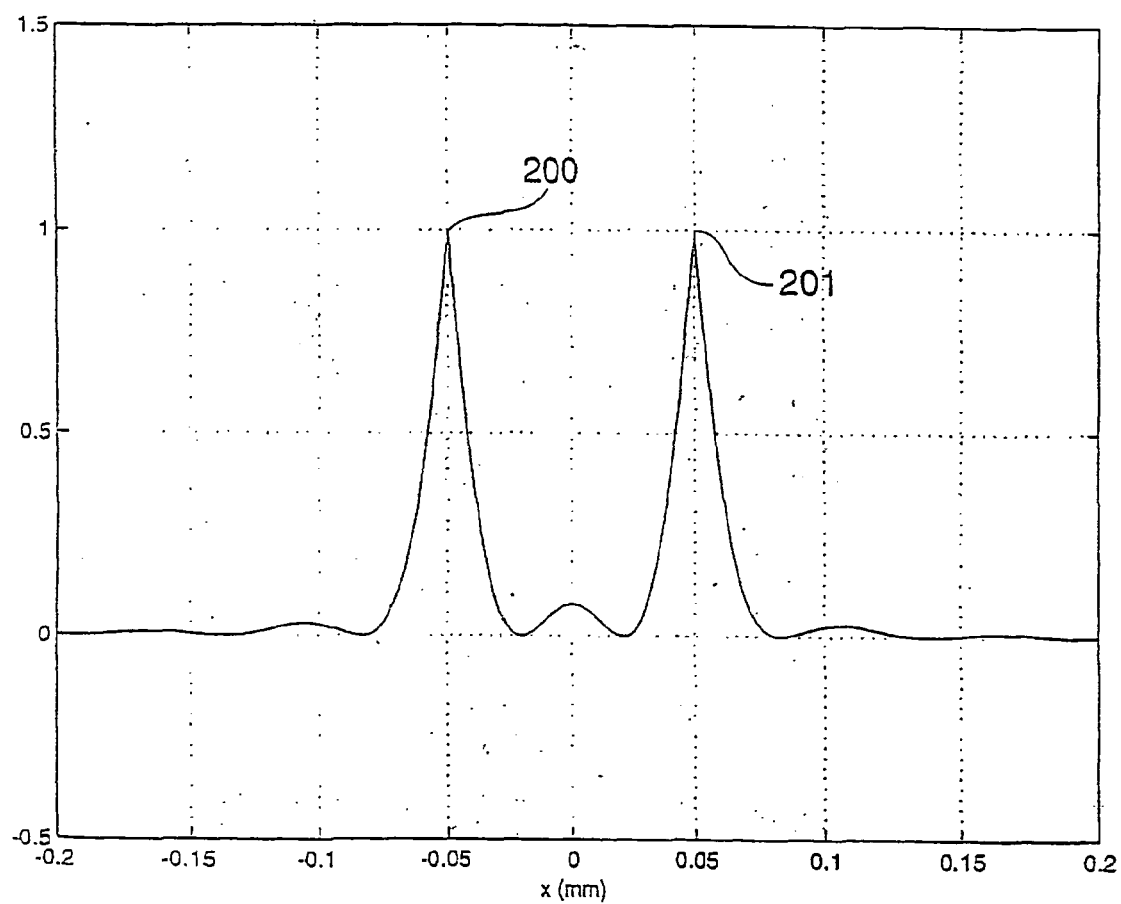
FIG. 8 is a chart of the field intensity obtained according to the prior art.

FIG. 8 shows the field intensity as it would be obtained by using a high-pass filter only, as suggested by the prior art, under the same conditions as described hereinbefore for explaining the invention. It can be appreciated that a single peak (discontinuity point) appears in correspondence with each edge, said peak being due to the spatial components at very high frequency, which are not stopped. In that case, the requested value would be proportional to the spacing between the two singularity points 200 and 201.

More generally, it can be stated that, when a uniform field (such as the field associated with beam 2), perturbed by the spatial discontinuity consisting of an opaque obstacle placed in the field itself (object 5), is submitted to a band-pass spatial filtering (that is to a filtering in which both the continuous wave component—at zero frequency—and the high spatial frequency components are stopped), then the field distribution at detector 10 is a continuous function. According to the convolution theorem, that function is given by the sum of a plurality of functions, which are identical to one another apart from the sign and are each exactly centred in correspondence with the spatial discontinuity that has originally perturbed the field (that is the edges of object 5). Such functions only depend on the constructional features of filter 8 and not on the features of object 5 to be measured.

This clearly shows that it is convenient to choose a suitable kind of band-pass filter that generates distributions very easy to be detected in correspondence with each discontinuity or object edge. The described example is one such case. In the example, each discontinuity gives rises to an oscillating group (see FIGS. 7a, 7b) only consisting of the spatial frequencies that depend on the known and geometrical size of the band-pass filter with a slot.

Yet, even optical structures more complex than the simple one shown in FIGS. 4a and 4b and disclosed up to now can also be constructed and employed, provided that:

such structures are capable of stopping the continuous wave spatial component (at zero frequency) of a field distribution (high-pass filtering, allowing extracting the object contour);

such structures are capable of stopping at the same time the high spatial frequency components of the distribution (low-pass filtering, allowing eliminating the discontinuity points in the resulting distribution and the noise possibly introduced by non-ideal construction means);

both preceding conditions are so chosen that the passing (non stopped) light distribution still contains the information about the spatial position of the discontinuity points, that is of the object edges (in the exemplary embodiment, the constructional sizes of the filter slots allow a sufficient passband); and it is possible to previously know and to recognise the signal kind that must appear in correspondence with each object edge, and only the exact positions where such typical signals appear are unknown (i.e., are to be measured). The latter condition is made possible by suitably choosing the kind and the shape of the filter (in the exemplary embodiment, the oscillation frequencies of the oscillating groups are obtained from the physical sizes of the slots).

Suitable band-pass filters, different from the filters shown in FIGS. 4a and 4b, could comprise masks with a progressively varying transparency, that is masks without a sharp transition from a stop region (opacity) to a pass region (transparency), but with transition regions meeting precise rules. This could be obtained by a progressive blackening applied to a transparent support. Other kinds of filters could exhibit a deliberate asymmetry of the transparent slots with respect to the optical axis, or include a set of transparent slots, such as a grating, and so on.

Turning again to the example considered, it is to be appreciated that a signal like that shown in FIGS. 5a, 5b, comprising a maximum-minimum-maximum sequence in correspondence with each edge of the object, has several advantages from the measurement standpoint:

the sequence can be easily detected and processed by a software process or an electronic hardware circuit. Maxima and minima are concerned, so that the corresponding points are insensitive to offsets due to fluctuations in the source brightness or to drifts in the electronic circuitry;

the general shape of that signal only depends on the constructional size (that is known and fixed) of filter 8, and it is independent of the shape and size of the object under measurement. Thus, it is possible to set a single detection criterion (either hardware or software) that will generally apply to all object kinds and shapes;

the spacing between maxima 100, 101 in a pair is known and constant, since it only depends on the structure of band-pass filter 8 and not on the size of the measured object 5. Such a distance can be easily exploited as a measurement reference, by relating it to the unknown measure to be detected: a continuous self-calibration of the instrument is thus obtained;

the amplitudes of the maxima and their symmetry are an indication of the detection quality: in particular, such information could signal whether defects are present on an object edge.

By summarising, the band-pass spatial filtering allows obtaining a continuous end field distribution, comprising known and fixed function groups (a known and fixed set of spatial oscillation frequencies), without loosing the information about the original position of the edges of the object being measured.

Always with reference to FIGS. 5a and 5b, the very good correspondence between the theoretical behaviour and the actual one, shown by the oscilloscope trace, can be appreciated.

The fact that the field distribution at receiver 10 is continuous and that the maximum transmitted frequency is previously known is of paramount practical importance in respect of two basic aspects.

1) It is possible to convert the filtered (continuous) distribution of the field intensity into an electrical signal (that can be processed by electronic circuitry 11), which is also continuous and exactly corresponds with the optical one, notwithstanding the discrete sampling carried out by CCD detector 10 (which is a cheap and widely commercially available transducer). Even after such sampling, the original signal can be recovered without loss of information, if the maximum frequency in that signal is previously known (as in the concerned example) and provided of course that the conditions set by the sampling theorem are met. This can be readily obtained by properly choosing the overall magnification f2/f1 of lenses 7 and 9 and the density of the photosensitive elements on detector 10. Under such conditions, the staircase signal outputted by the CCD detector (line A in FIG. 6) can in turn be filtered by electronic band-pass filter 12. The resulting electrical signal (line B in FIG. 6) will be an analogue (i.e. continuous) signal and will be a true representation of the field intensity distribution. That signal, being continuous, allows ultra-high resolution measurements. It is to be pointed out that the described process could not be applied should the original distribution be discontinuous or consist of very high spatial frequencies (that is, of very narrow intensity peaks), like the distribution obtained according to the prior art.

2) The band-pass optical filtering and the corresponding electronic filtering "clean" the signal from all undesired noise components introduced by the non-ideal optical and electronic construction means. In particular, th e high spatial frequencies due to optical noise (granularity, small object displacements from the focal plane, non-ideal lenses) and to electronic noise (noises due to the supply, the sampling etc.) are stopped. At the same time, also the low frequency noises, in particular the continuous wave component (non-uniform illumination, electronic circuitry drifts etc.), are stopped.

As a conclusion, the double, optical and electronic, band-pass filtering allows transferring the useful information through non-ideal construction means, by making such information arrive without losses at computing unit 13. Such a result is made easier by the possible use of a cylindrical lens 7 in optical processing system 6.

It is to be pointed out that the simultaneous presence of two edges in an object being measured (or of an edge and a reference) at a non-infinite relative distance ($w_{strip}$) may give rise to a mutual influence between the functional groups generated in correspondence with each edge, which influence is not yet completely damped at the distance corresponding to the position of the second edge. In the described example, this entails that the distance between the two intensity minima is not exactly $w_{strip}$. The closer the edges, the greater the error.

That measurement error can however be easily corrected, by using a simple look-up table, by taking into account that in any case a one-to-one correspondence exists between the actual object size and the spacing between the two minima, that is, different actual object sizes correspond with different spacing between the minima (that is, with different measures) and vice versa. Measurement repeatability is thus ensured.

If the computing unit and the measurement time requirements allow so, it is also possible to determine the error through a mathematical computation: once the spacing between the two minima has been measured on the detected signal, a first error estimation is computed by recovering the overall distribution for a distance equal to the measured distance; a new distance value is then obtained. By recursively repeating the computation, the error can be minimised at will through successive approximations.

Figure 6:
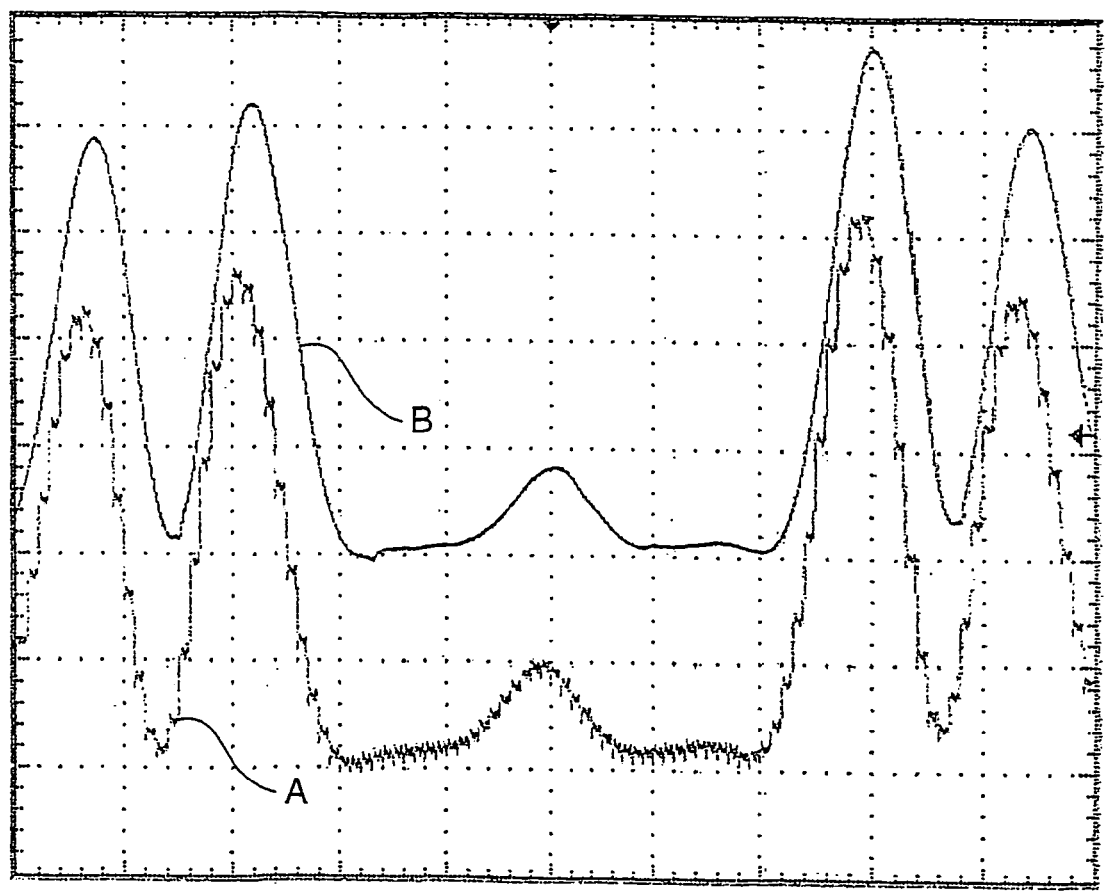
FIG. 6 is a chart on enlarged scale of the electrical signal detected immediately at the detector output and after the electrical band-pass filtering.

Turning again to the band-pass filter 8 shown in FIGS. 4a and 4b, experimental tests have shown that a good identification of the edges is achieved if ratio $w_{hi}/w_{lo}$ between width $w_{hi}$ of transparent window 8" and width $w_{lo}$ of opaque element 8' meets the condition $2.5 \leq w_{hi}/w_{lo} \leq 7$. Furthermore, if the values of $w_{hi}/w_{lo}$ are odd integer numbers, the amplitudes of the secondary oscillation maxima in the field distribution are minimized and introduction of spurious spatial frequencies is avoided, as it can clearly be deduced from the mathematical analysis. If moreover $w_{hi}/w_{lo} \leq 5$, the main lobes of the twin-peak signal do not exhibit relative maxima and minima that could deceive the detection process. Thus, in the preferred embodiments, $w_{hi}/w_{lo}$ could be 3 or 5. FIGS. 5 to 7 refer to the case $w_{hi}/w_{lo}=5$.

It is to be appreciated that, even if the invention has been disclosed with reference to the dimensional measurement on a wire, it can be used with advantage whenever a measurement on any object is to be carried out, either with respect to two points located on the object and capable of originating a discontinuity in the distribution of the field associated with beam 2, or to a point on the object and an external reference.

It is self evident that the above description is given only by way of non-limiting example and that changes and modifications are possible without departing from the scope of the invention, as defined in the appended claims.

The invention claimed is:

1. Method of performing geometrical measurements on an object, comprising the steps of: illuminating the object with a light beam having a field distribution with substantially constant intensity, so as to obtain, past the object, a field distribution with discontinuity points in correspondence with points concerned by the measurement; submitting the beam past the object to a spatial optical filtering; detecting the filtered beam thereby generating an electrical signal representative of the intensity of the field associated with the filtered beam; and obtaining the value of a requested quantity by processing said electrical signal; characterized in that said spatial filtering is a band-pass filtering originating on a detection plane a continuous field distribution that is the sum of a plurality of functions which are identical to one another apart the sign, are centered exactly in correspondence with a discontinuity point and only depend on the characteristics of the band-pass filtering, said field distribution having an intensity exhibiting a pair of marked maxima separated by a minimum in correspondence with each discontinuity point, said processing of the electrical signal providing the position of said minimum relative to an axis of the measurement beam, wherein a spacing between said minima at said discontinuity points corresponds to a size of said object.

2. A method as claimed in claim 1, characterized in that said processing of the electrical signal comprises a band-pass filtering, with temporal cut-off frequencies corresponding with the spatial cut-off frequencies of the optical band-pass filtering.

3. A method as claimed in claim 1, characterized in that at least one of said discontinuity points is formed by an edge of the object.

4. A method as claimed in claim 1, characterized in that said optical band-pass filtering originates, on said detection plane, a continuous field distribution comprising, in correspondence with each discontinuity point, oscillating groups of which the oscillation frequencies and the durations depend on the characteristics of the band-pass filtering and the oscillation center is related with the position of the respective discontinuity point, the oscillation groups having intensities exhibiting said pair of marked maxima separated by a minimum in accordance with the oscillation center.

5. A method as claimed in claim 4, characterized in that said optical band-pass filtering is carried out by means of a filter comprising an opaque region center on the axis of the beam and having a first width ($w_{lo}$), and a transparent region also centered on the axis of the beam and having a second width ($w_{hi}$), greater than the first width.

6. A method as claimed in claim 5, characterized in that said first and second widths ($W_{lo}$, $w_{hi}$) meet the condition $2.5 \leq w_{hi}/w_{lo} 7$.

7. A method as claimed in claim 6, characterized in that said first and second widths ($w_{lo}$, $w_{hi}$) meet the condition $w_{hi}/w_{lo}=n$, n being an odd integer number.

8. A method as claimed in claim 7, characterized in that said first and second widths ($w_{lo}$, $w_{hi}$) meet the condition $w_{hi}/w_{lo}=n$, where $n \leq 5$.

9. A method as claimed in claim 1, characterized in that said optical band-pass filtering is carried out by means of a filter comprising opaque and transparent regions asymmetrically arranged with respect to the axis of the beam.

10. A method as claimed in claim 1, characterized in that said optical band-pass filtering is carried out by means of a filter having a gradual transmittance variation between regions arranged in correspondence of the pass band and regions arranged in correspondence of bands to be rejected.

11. A method as claimed in claim 1, characterized in that said optical band-pass filtering is carried out by means of a filter consisting of a grating.

12. An optical device for performing geometrical measurements on an object, comprising:
  means for generating a monochromatic light beam having a field distribution with substantially constant intensity, the object being placed along the path of the beam so as to generate, in the field distribution past the object itself, discontinuity points in correspondence with points concerned by the measurement;
  optical processing means, comprising a first and a second confocal converging lens and a spatial filter placed in the common focal plane of said lenses, said optical processing means being located past the object so that the latter is located in the focal plane of the first lens opposite to the common focal plane;
  detection means located in the focal plane of the second lens opposite to the common focal plane, to collect a filtered beam outgoing from the optical processing means and to generate an electrical signal representative of the intensity of the field associated with said filtered beam;
  means for processing said electrical signal, arranged to provide the value of a requested quantity;
  characterized in that the spatial filter is a band-pass optical filter originating, on the detection means, a continuous field distribution that is the sum of a plurality of functions which are identical to one another apart from the sign, are centered exactly in correspondence with a discontinuity point and only depend on the characteristics of the band-pass filter, said field distribution having an intensity exhibiting a pair of marked maxima separated by a minimum in correspondence with each discontinuity point, the electrical signal processing means being arranged to determine the position of said minimum relative to an optical axis of the optical processing means.

13. A device as claimed in claim 12, characterized in that said electrical signal processing means comprises a band-pass filter, with temporal cut-off frequencies corresponding with the spatial cut-off frequencies of the optical band-pass filter.

14. A device as claimed in claim 12, characterized in that said object is located in the monochromatic light beam at such a position that at least one of said discontinuity points is formed by an edge of the object.

15. A device as claimed in claim 12, characterized in that said optical band-pass filter is arranged to originate, on said detection plane, a continuous field distribution comprising, in correspondence with each discontinuity point, oscillating groups of which the oscillation frequencies and the durations depend on the characteristics of the band-pass filter, and the oscillation center is related with the position of the respective discontinuity point, the oscillating groups having intensities exhibiting said pair of marked maxima separated by a minimum in correspondence with the oscillation center.

16. A device as claimed in claim 15, characterized in that said optical band-pass filter is an element comprising an opaque region centered on the axis of the beam and having a first width ($w_{lo}$), and a transparent region also centered on the axis of the beam and having a second width ($w_{hi}$), greater than the first width.

17. A device as claimed in claim 16, characterized in that said first and second widths ($w_{lo}$, $w_{hi}$) meet the condition $2.5 \leq w_{hi}/w_{lo} \leq 7$.

18. A device as claimed in claim 17, characterized in that said first and second widths ($w_{lo}$, $w_{hi}$) meet the condition $w_{hi}/w_{lo}=n$, n being an odd integer number.

19. A device as claimed in claim 18, characterized in that said first and second widths ($w_{lo}$, $w_{hi}$) meet the condition $w_{hi}/w_{lo}=n$, where $n \leq 5$.

20. A device as claimed in claim 16, characterized in that the transparent region is an annulus surrounding the opaque region.

21. A device as claimed in claim 12, characterized in that said optical band-pass filter is a mask comprising opaque and transparent regions asymmetrically arranged with respect to the axis of the beam.

22. A device as claimed in claim 12, characterized in that said optical band-pass filtering is a mask having a gradual transmittance variation between regions arranged in correspondence with the pass band and regions arranged in correspondence with bands to be rejected.

23. A device as claimed in claim 12, characterized in that said optical band-pass filter consists of a grating.

* * * * *